United States Patent
Ladra et al.

(10) Patent No.: US 7,950,639 B2
(45) Date of Patent: May 31, 2011

(54) DEVICE FOR PLACING AN OBJECT

(75) Inventors: Uwe Ladra, Erlangen (DE); Dietmar Stoiber, Fürth (DE)

(73) Assignee: Siemens Aktiengesellschaft, München (DE)

(*) Notice: Subject to any disclaimer, the term of this patent is extended or adjusted under 35 U.S.C. 154(b) by 1199 days.

(21) Appl. No.: 11/570,108

(22) PCT Filed: Jun. 14, 2005

(86) PCT No.: PCT/EP2005/052746
§ 371 (c)(1),
(2), (4) Date: Dec. 6, 2006

(87) PCT Pub. No.: WO2005/123331
PCT Pub. Date: Dec. 29, 2005

(65) Prior Publication Data
US 2008/0258033 A1    Oct. 23, 2008

(30) Foreign Application Priority Data
Jun. 17, 2004   (DE) .......................... 10 2004 029 359

(51) Int. Cl.
*B23Q 3/00* (2006.01)
(52) U.S. Cl. ........................................ 269/296; 269/297
(58) Field of Classification Search ................ 269/296, 269/297, 298, 289 R, 53, 54.5, 54.1; 29/25.35, 29/759, 760; 248/634
See application file for complete search history.

(56) References Cited

U.S. PATENT DOCUMENTS

| | | | | |
|---|---|---|---|---|
| 3,942,781 A * | 3/1976 | Gerber | ...................... | 269/289 R |
| 4,153,240 A * | 5/1979 | Gouley | ........................ | 493/419 |
| 4,579,271 A * | 4/1986 | Fujita et al. | ..................... | 228/46 |
| 4,685,363 A * | 8/1987 | Gerber | ............................. | 83/22 |
| 4,799,659 A * | 1/1989 | Donovan | .................. | 269/289 R |
| 5,020,405 A * | 6/1991 | Wolfson et al. | ................. | 83/374 |
| 5,241,733 A * | 9/1993 | Rosen | ............................. | 29/416 |
| 6,095,025 A * | 8/2000 | Mirabello | ....................... | 83/177 |

FOREIGN PATENT DOCUMENTS

| | | |
|---|---|---|
| DE | 88 05 081 U1 | 7/1988 |
| DE | 197 10 630 | 9/1998 |
| DE | 200 00 583 U1 | 6/2000 |
| DE | 20 2004 000 583 U1 | 5/2004 |
| EP | 0 338 132 A2 | 10/1989 |
| EP | 0 482 702 A1 | 4/1992 |
| EP | 0 972 600 A2 | 1/2000 |
| EP | 1 338 375 A2 | 6/2003 |
| JP | 8250021 A | 9/1996 |
| JP | 11244967 A | 9/1999 |
| JP | 2001170727 A | 6/2001 |

* cited by examiner

*Primary Examiner* — George Nguyen
(74) *Attorney, Agent, or Firm* — Henry M. Feiereisen; Ursula B. Day

(57) ABSTRACT

The invention relates to a device (10) which is used to place an object (1). The object (1) is placed on brushes (5,6), whereby a first part of the brushes (5) are in contact with the surface (4) of the object (1) and alternatively with a second part of the brushes (6). The invention also relates to a device (10) which is used to place an object (1) placed on brushes (5,6) enabling the object to (1) be positioned in a precise manner.

20 Claims, 4 Drawing Sheets

DEVICE FOR PLACING AN OBJECT

BACKGROUND OF THE INVENTION

The invention relates to a device for placing an object in which the object is placed on brushes, whereby a first part of the brushes and a second part of the brushes alternately maintain contact with a surface of the object.

On machines such as e.g. machine tools, production machines or robots that process objects such as e.g. plates, different possibilities are known for placing objects. In a frequently encountered placement possibility, the objects are placed on brushes.

FIG. 1 shows such a common placement of an object, that in the example in FIG. 1 takes the form of a plate 1. The plate 1 is placed in the normal manner on brushes 3 that are connected to a machine bed 2. The brushes here have contact with a surface 4 of the plate 1. The contact between the plate 1 and the surface 4 of the object 1 results in an adhesion during transport of the plate 1 by a drive mechanism (not illustrated for the sake of clarity) at the travel speed v, that in conjunction with the weight $F_G$ of the plate 1 causes a bending of the brushes 3.

FIG. 2 shows such bent brushes 3 that result when the plate 1 is drawn over the brushes 3 at a speed v. In FIG. 2 the same elements are indicated with the same reference numbers as in FIG. 1.

The placement of the plate 1 on such bent brushes 3 has certain disadvantages. The object, i.e. in the illustrative embodiment the plate 1, can move easily due to the bent brushes 3, in particular in a horizontal transverse direction relative to the bending direction, whereby the bending direction in FIG. 2 is identical with the direction of the speed v. This leads to instabilities and poor guidance in the transport of the object during a machining process on the object. This leads to a poor machining quality of the object. The constantly changing friction conditions that depend e.g. on the extent of bending of the brushes 3 also lead to a deterioration in the positioning accuracy of the object. The abovementioned problem is further exacerbated if the direction of the travel movement of the object is reversed or changed during the machining process.

A device for the alignment of flat objects transported in a continuous series is known from German laid-open specification 197 10 630 A1. In order to reduce the load and hence the wear on the brushes due to fluctuating thicknesses of the specimens and to permit delicate alignment of the specimens in transport direction, each brush is supported in a spring-like manner by a working cylinder with variable pressure.

A device for computer-controlled precision cutting of plates with a bristle table is known from the European laid-open specification 0 972 600 A2.

A transport device for plates is known from European laid-open specification 0 482 702 A1.

A coordinate table for positioning of workpieces such as e.g. sheet steel billets relative to the workstation of a punching machine is known from European laid-open specification 0 338 132 A2.

A device for supporting and transporting steel plates during machining in a punching and/or cutting machine is known from the European laid-open specification EP 0 482 702 A1.

A coordinate table for a punching machine, consisting at least of one workpiece supporting surface resting on a frame with bristles protruding out of the workpiece supporting surface in preferably uniform distribution that together form a workpiece supporting plane is known from German utility model DE 88 05 081 U1.

A device for discontinuous transport of rod-like workpieces, in particular solid sections and tubular sections, laterally to the direction of movement on a transport track with at least one transport standstill is known from the German utility model DE 200 00 583 U1, whereby at least on one side of the transport track or at the face end of the workpieces the device has at least one device for machining and/or coating and/or cleaning and/or measurement that is active only during at least one transport standstill.

SUMMARY OF THE INVENTION

The object of the invention is to provide a device for placing an object placed on brushes, with the device permitting a good positioning accuracy of the object.

The object is achieved by a device for placing an object in which the object is placed on brushes, whereby a first part of the brushes and a second part of the brushes alternately maintain contact with a surface of the object, with the alternating contact with the surface of the object being achieved by alternate raising and lowering of the first part of the brushes and of the second part of the brushes.

It has proved to be advantageous that the alternating contact with the surface of the object can be achieved by alternate raising and lowering of the first part of the brushes and of the second part of the brushes. This permits a particularly simple changing of the contact with the surface of the object.

It has furthermore proved to be advantageous that the first part of the brushes and the second part of the brushes are mounted in matrices that can be moved relative to one another. A particularly simple placement of the brushes can be achieved by means of movable matrices.

It has furthermore proved to be advantageous if the alternate raising and lowering of the first part of the brushes and of the second part of the brushes can be performed by active actuating elements. Active actuating elements are particularly suitable for performing the raising and lowering movement of the first and of the second part of the brushes.

It has furthermore proved to be advantageous if the active actuating elements have the form of piezo actuators or magnetostrictive actuators. Piezo actuators and magnetostrictive actuators are widely used active actuating elements.

It has furthermore proved to be advantageous if the object has the form of a plate. A plate represents a normal form of the object, although the object can naturally also take other forms.

The device according to the invention for placing an object is particularly suitable for placement of objects on machine tools, production machines or robots. The device according to the invention can, however, naturally also be employed with other machines.

BRIEF DESCRIPTION OF THE DRAWING

Two illustrative embodiments of the invention are shown in the drawing and are described in greater detail below.

DETAILED DESCRIPTION OF PREFERRED EMBODIMENTS

Figure 1:
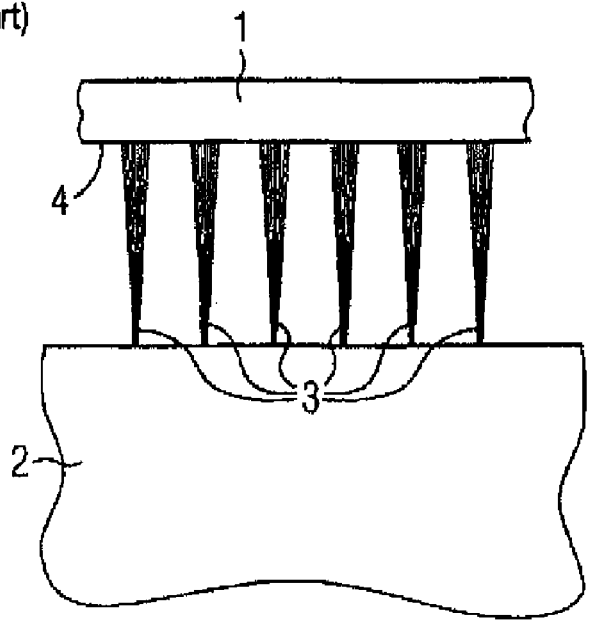
FIG. 1 shows a prior art placement of an object on brushes in the rest state.
Figure 2:
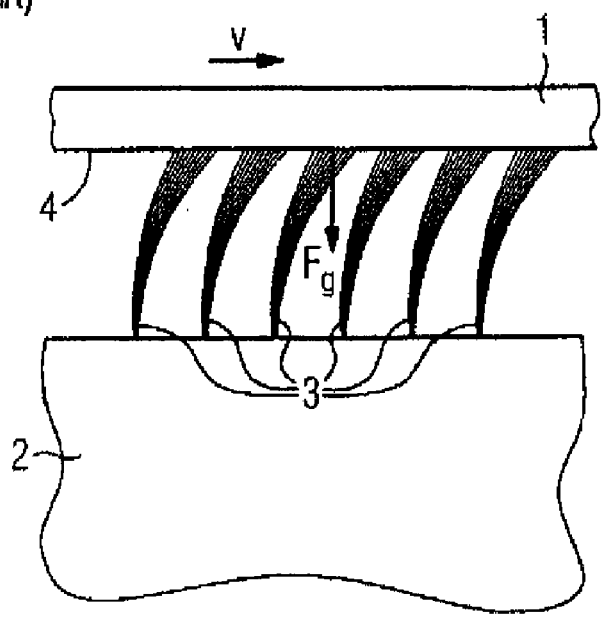
FIG. 2 shows a prior art placement of an object on brushes during a transport process.
Figure 3:
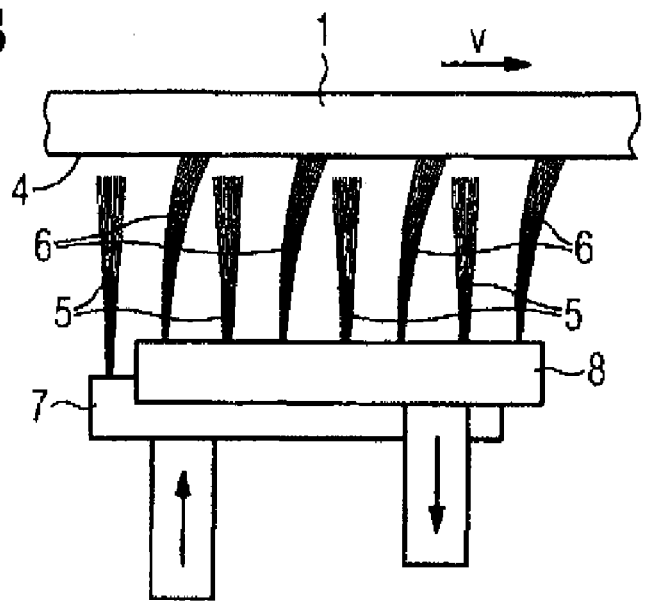
FIGS. 3, 4 show a first illustrative embodiment of the device according to the invention.
Figure 4:
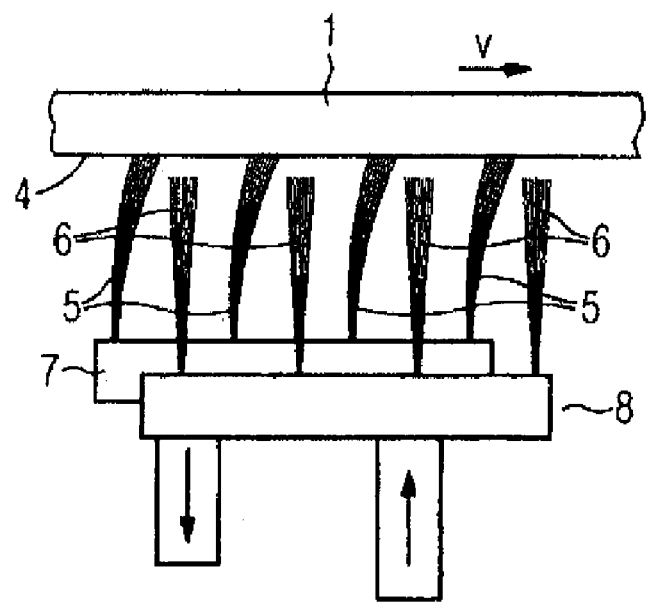

FIGS. 3 and 4 show a first illustrative embodiment of the device according to the invention in the form of diagrammatic representations. An object that in the illustrative embodiment has the form of a plate 1, is placed on brushes. A first part of the brushes 5 is connected to a matrix 7. A second part of the brushes 6 is connected to a matrix 8. By alternately raising and lowering the first part of the brush 5 and the second part of the brushes 6, an alternating contact is maintained between the brushes and a surface 4 of the plate. In the first illustrative embodiment shown in FIGS. 3 and 4, the alternating raising and lowering of the first part of the brushes 5 and of the second part of the brushes 6 is achieved by alternately raising and lowering the matrices 7 and 8 that can be moved towards one another. FIG. 3 shows the point at which the first part of the brushes 5 has no contact with the surface of the plate, while the second part of the brushes 6 is in contact with the surface of the plate 1. At the moment shown in FIG. 3, the plate 1 is thus placed on the second part of the brushes 6. In the next step, the matrix 8 is now lowered and the matrix 7 is raised, as indicated by two arrows in FIG. 3.

FIG. 4 shows a further point at which the first part of the brushes 5 is raised with the matrix 7 and the first part of the brushes 5 is in contact with the surface 4 of the plate, while the second part of the brushes 6 has just been lowered with the matrix 8 so that the second part of the brushes 6 is just no longer in contact with the surface of the plate 1. The movable matrices 7 and 8 are thereby alternately raised and lowered by an electric drive mechanism that for the sake of clarity is not illustrated in FIGS. 3 and 4.

In the illustrative embodiment, the plate is moved in the direction of the arrow shown with the travel speed v. At the moment when the contact between the respective brushes and the plate 1 is just lost by the lowering movement, the adhesion is lost and the respective brushes can relax. If the raising and lowering process alternates sufficiently quickly in relation to the travel speed v, the respective brushes that are just in contact with the surface 4 of the plate are only minimally bent. The object to be transported, i.e. in the illustrative embodiment the plate 1, can thus be positioned significantly more accurately, resulting in an improved machining quality and in particular an increased machining precision. A further positive effect is a reduced friction during placement of the object. Rapid alternate raising and lowering of the brushes enables the object to be placed practically friction-free.

Figure 5:
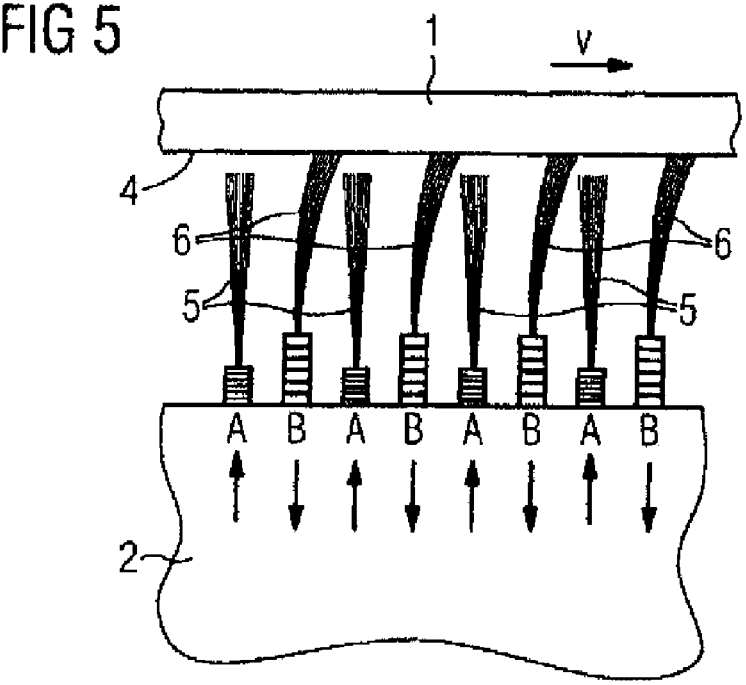
FIGS. 5, 6 show a second illustrative embodiment of the device according to the invention.
Figure 6:
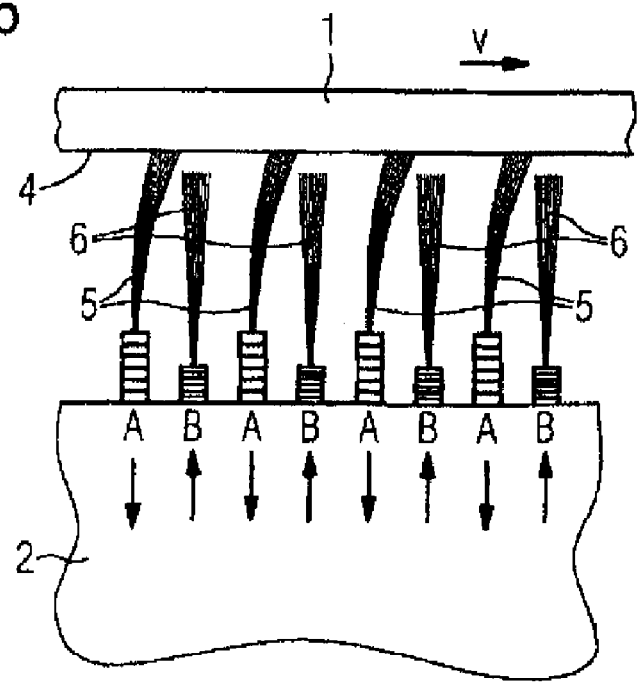

FIGS. 5 and 6 show a further illustrative embodiment of the device according to the invention in the form of a diagrammatic representation. The embodiment shown in FIGS. 5 and 6 corresponds essentially to the embodiment described above in FIGS. 3 and 4. The same elements are therefore indicated in FIGS. 5 and 6 with the same reference numbers as in FIGS. 3 and 4. The only significant difference between the two embodiments consists in that in the embodiment shown in FIGS. 5 and 6, the alternate raising and lowering of the first part of the brushes 5 and of the second part of the brushes 6 is performed not with movable matrices but with active actuating elements A and B that can, for example, take the form of piezo actuators or magnetostrictive actuators. The first part of the brushes 5 is thereby connected to the active actuating elements identified with A and the second part of the brushes 6 is connected to the active actuating elements identified with B. Two different moments in time are shown in each of FIGS. 5 and 6. FIG. 5 shows the moment when the first part of the brushes has just been lowered by means of the active actuating elements A, and the active actuating elements B have raised the second part of the brushes 6, so that the second part of the brushes 6 is just in contact with the surface 4 of the plate 6.

In the following step, as indicated by corresponding arrows, the first part of the brushes 5 is now raised by means of the active actuating elements A, and the second part of the brushes 6 is lowered by means of the active actuating elements B. FIG. 6 shows a later point in time where the first part of the brushes 5 is just raised and the second part of the brushes 6 is lowered. In the following step, as also indicated by arrows in FIG. 6, the first part of the brushes 5 is lowered by means of the active actuating elements A and the second part of the brushes 6 is raised by means of the active actuating elements B so that the contact with the surface 4 of the plate 6 changes from the first part of the brushes 5 to the second part of the brushes 6.

Figure 7:
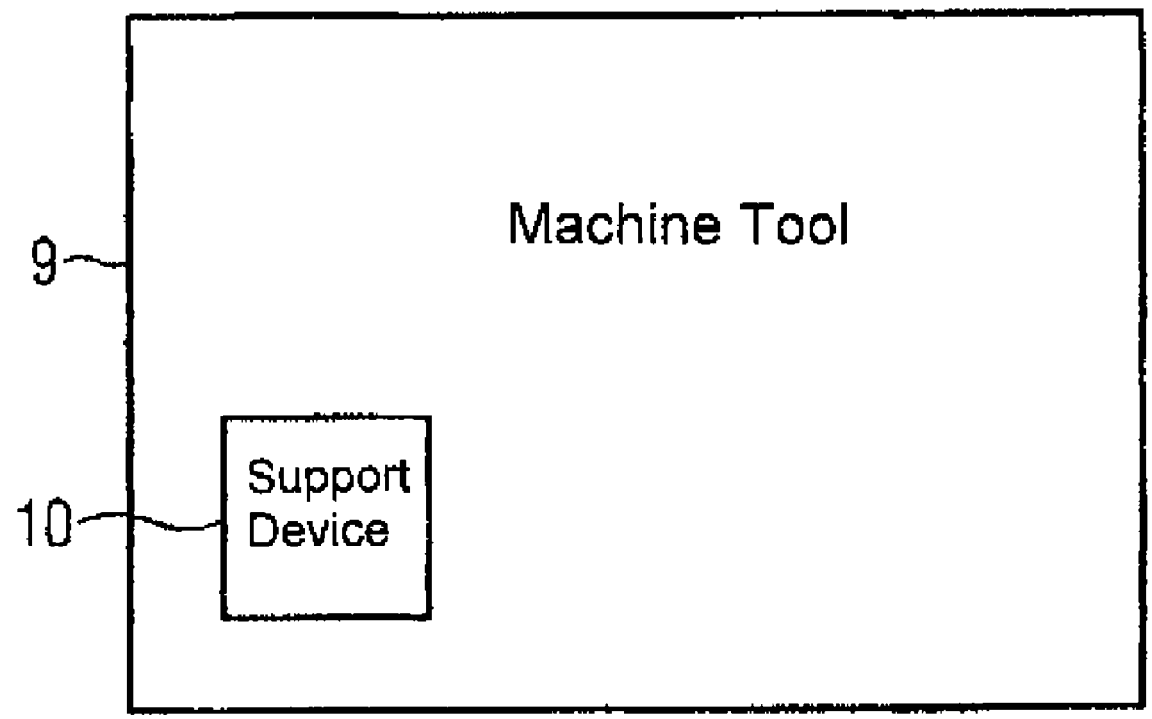
FIG. 7 shows a machine tool with the device according to the invention.

FIG. 7 shows a machine tool 9 with the device 10 according to the invention for placing of an object in the form of a block circuit diagram. Instead of a machine tool, however, a production machine or a robot or some other machine could also be provided in FIG. 7.

It is conceivable that in addition to the first part of the brushes 5 and the second part of the brushes 6, further parts of brushes are provided that alternately make contact with the surface 4 of the object 1.

The device according to the invention is particularly suitable for placement of objects on machine tools such as e.g. punching machines, laser cutting machines and nibbling machines.

What is claimed is:

1. A device for placing an object, in which the object is placed on brushes, with a first plurality of brushes and a second plurality of brushes alternately maintaining contact with a surface of the object, by alternate raising and lowering of the first plurality of brushes and of the second plurality of brushes.

2. The device as claimed in claim 1, wherein the first plurality of brushes and the second plurality of brushes are mounted in matrices which are moveable relative to one another.

3. The device as claimed in claim 1, wherein the alternate raising and lowering of the first plurality of brushes and of the second plurality of brushes is executed by active actuating elements.

4. The device as claimed in claim 3, wherein the active actuating elements have the form of piezo actuators or magnetostrictive actuators.

5. The device as claimed in claim 1, wherein the object has the form of a plate.

6. A machine tool, production machine or robot with a device for placing an object as claimed in claim 1.

7. A device for support of an object, comprising:
   a brush assembly having first and second brushes which alternately maintain a contact with a surface of the object; and
   an operating mechanism for alternatingly raising and lowering the first and second brushes to implement the alternate contact of the first and second brushes with the surface of the object, thereby reducing friction between the object and the brush assembly and allowing those brushes that are not in contact with the surface to relax and to minimize bending thereof.

8. The device of claim 7, wherein the operating mechanism includes a first matrix for carrying the first brushes, and a second matrix for carrying the second brushes, with the first and second matrices moveable relative to one another.

9. The device of claim 8, wherein the first and second matrices are disposed in parallel relationship.

10. The device of claim 7, wherein the operating mechanism includes a plurality of active actuating elements for alternatingly raising and lowering the first and second brushes.

11. The device of claim 10, wherein the active actuating elements are constructed in the form of piezo actuators.

12. The device of claim 10, wherein the active actuating elements are constructed in the form of magnetostrictive actuators.

13. The device of claim 7, wherein the object has a plate-shaped configuration.

14. A machine tool, production machine or robot, comprising a device for placing an object, with the device including a brush assembly having first and second brushes which alternately maintain a contact with a surface of the object, and an operating mechanism for alternatingly raising and lowering the first and second brushes to implement the alternate contact of the first and second brushes with the surface of the object, thereby reducing friction between the object and the brush assembly and allowing those brushes that are not in contact with the surface to relax and to minimize bending thereof.

15. The machine tool, production machine or robot of claim 14, wherein the operating mechanism includes a first matrix for supporting the first brushes, and a second matrix for supporting the second brushes, with the first and second matrices moveable relative to one another.

16. The machine tool, production machine or robot of claim 15, wherein the first and second matrices are disposed in parallel relationship.

17. The machine tool, production machine or robot of claim 14, wherein the operating mechanism includes a plurality of active actuating elements for alternatingly raising and lowering the first and second brushes.

18. The machine tool, production machine or robot of claim 17, wherein the active actuating elements are constructed in the form of piezo actuators.

19. The machine tool, production machine or robot of claim 17, wherein the active actuating elements are constructed in the form of magnetostrictive actuators.

20. The machine tool, production machine or robot of claim 14, wherein the object has a plate-shaped configuration.

* * * * *